US012294831B2

(12) United States Patent
Joke et al.

(10) Patent No.: US 12,294,831 B2
(45) Date of Patent: May 6, 2025

(54) ELECTROACOUSTIC TRANSDUCER

(71) Applicants: DENSO CORPORATION, Kariya (JP); TOYOTA JIDOSHA KABUSHIKI KAISHA, Toyota (JP); MIRISE Technologies Corporation, Nisshin (JP); Nisshinbo Micro Devices Inc., Tokyo (JP)

(72) Inventors: Tomoya Joke, Nisshin (JP); Tetsuya Enomoto, Nisshin (JP); Hideo Yamada, Nisshin (JP); Shuji Katakami, Tokyo (JP); Takashi Kakefuda, Tokyo (JP); Takahide Usui, Tokyo (JP)

(73) Assignees: DENSO CORPORATION, Kariya (JP); TOYOTA JIDOSHA KABUSHIKI KAISHA, Toyota (JP); MIRISE Technologies Corporation, Nisshin (JP); Nisshinbo Micro Devices Inc., Tokyo (JP)

( * ) Notice: Subject to any disclaimer, the term of this patent is extended or adjusted under 35 U.S.C. 154(b) by 199 days.

(21) Appl. No.: 18/181,912

(22) Filed: Mar. 10, 2023

(65) Prior Publication Data

US 2023/0362550 A1 Nov. 9, 2023

(30) Foreign Application Priority Data

May 9, 2022 (JP) ................................ 2022-077145

(51) Int. Cl.
*H04R 17/00* (2006.01)

(52) U.S. Cl.
CPC .................................... *H04R 17/00* (2013.01)

(58) Field of Classification Search
CPC ...... H04R 17/00; H04R 17/02; H04R 1/2869; H04R 7/22; H04R 2201/003; H04R 2410/03; H04R 7/10; H10N 30/30; H01L 41/04
See application file for complete search history.

(56) References Cited

U.S. PATENT DOCUMENTS

| | | | | |
|---|---|---|---|---|
| 2008/0218031 A1 | | 9/2008 | Kuroda et al. | |
| 2022/0279285 A1 | * | 9/2022 | Kuchiji | H10N 30/30 |

FOREIGN PATENT DOCUMENTS

| | | | | | |
|---|---|---|---|---|---|
| JP | 2021197513 A | * | 12/2021 | | H01L 41/04 |
| JP | 2022-7879 A | | 1/2022 | | |
| WO | WO-2021024865 A1 | * | 2/2021 | | H04R 17/02 |

* cited by examiner

*Primary Examiner* — Angelica M McKinney
(74) *Attorney, Agent, or Firm* — Posz Law Group, PLC

(57) ABSTRACT

An electroacoustic transducer includes a vibrating portion, a slit and an elastic film. The vibrating portion has a fixed end portion and a free end portion, and extends as a cantilever from the fixed end portion toward the free end portion along an extending direction orthogonal to a directivity axis to vibrate in a manner that the free end portion moves along the directivity axis. The slit is formed at two ends of the vibrating portion in a width direction orthogonal to the directivity axis and orthogonal to the extending direction. The elastic film is provided to close the slit in an axial direction that is aligned with the directivity axis. The slit includes a wide portion provided on a free end side and a narrow portion narrower than the wide portion. The elastic film is provided to close the wide portion while not closing the narrow portion.

11 Claims, 9 Drawing Sheets

ELECTROACOUSTIC TRANSDUCER

CROSS REFERENCE TO RELATED APPLICATION

The present application is based on and claims the benefit of priority of Japanese Patent Application No. 2022-077145, filed on May 9, 2022, the disclosure of which is incorporated herein by reference.

TECHNICAL FIELD

The present disclosure relates to an electroacoustic transducer.

BACKGROUND ART

A conventional piezoelectric element includes a piezoelectric element portion, a support portion that supports a peripheral portion of the piezoelectric element portion, and an elastic film having higher elasticity than the piezoelectric element portion. The elastic film is provided in a vibration region inside the peripheral portion of the piezoelectric element portion. The vibration region of the piezoelectric element portion is provided with a slit penetrating through the vibration region in the thickness direction. The elastic film covers at least a part of an opening of the slit in the vibration region, and is arranged to integrate vibration region parts that are separated by the slit.

SUMMARY

According to an aspect of the present disclosure, an electroacoustic transducer includes a vibrating portion, a slit and an elastic film. The vibrating portion includes a fixed end portion and a free end portion, and extends as a cantilever from the fixed end portion to the free end portion along an extending direction that is orthogonal to a directivity axis to vibrate in a manner that the free end portion moves along the directivity axis. The slit is provided at two ends of the vibrating portion in a width direction that is orthogonal to the directivity axis and orthogonal to the extending direction. The elastic film is provided to close the slit in an axial direction aligned with the directivity axis. The slit includes a wide portion provided on a free end side, and a narrow portion that extends from the wide portion and is narrower than the wide portion, and the elastic film is provided to close the wide portion while without closing the narrow portion.

According to another aspect of the present disclosure, an electroacoustic transducer includes a vibrating portion, a slit and a through-hole portion. The vibrating portion includes a fixed end portion and a free end portion, and extends as a cantilever from the fixed end portion to the free end portion along an extending direction that is orthogonal to a directivity axis to vibrate in a manner that the free end portion moves along the directivity axis. The slit is provided at two ends of the vibrating portion in a width direction that is orthogonal to the directivity axis and orthogonal to the extending direction. The through-hole portion is provided to extend in an axial direction that is parallel to the directivity axis, and is arranged adjacently to the slit on a plane that intersects with the axial direction, to communicate with the slit on a side of the free end portion. In addition, the elastic film is provided to close the through-hole portion while without closing the slit in the axial direction.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT THE DISCLOSURE

Figure 1:
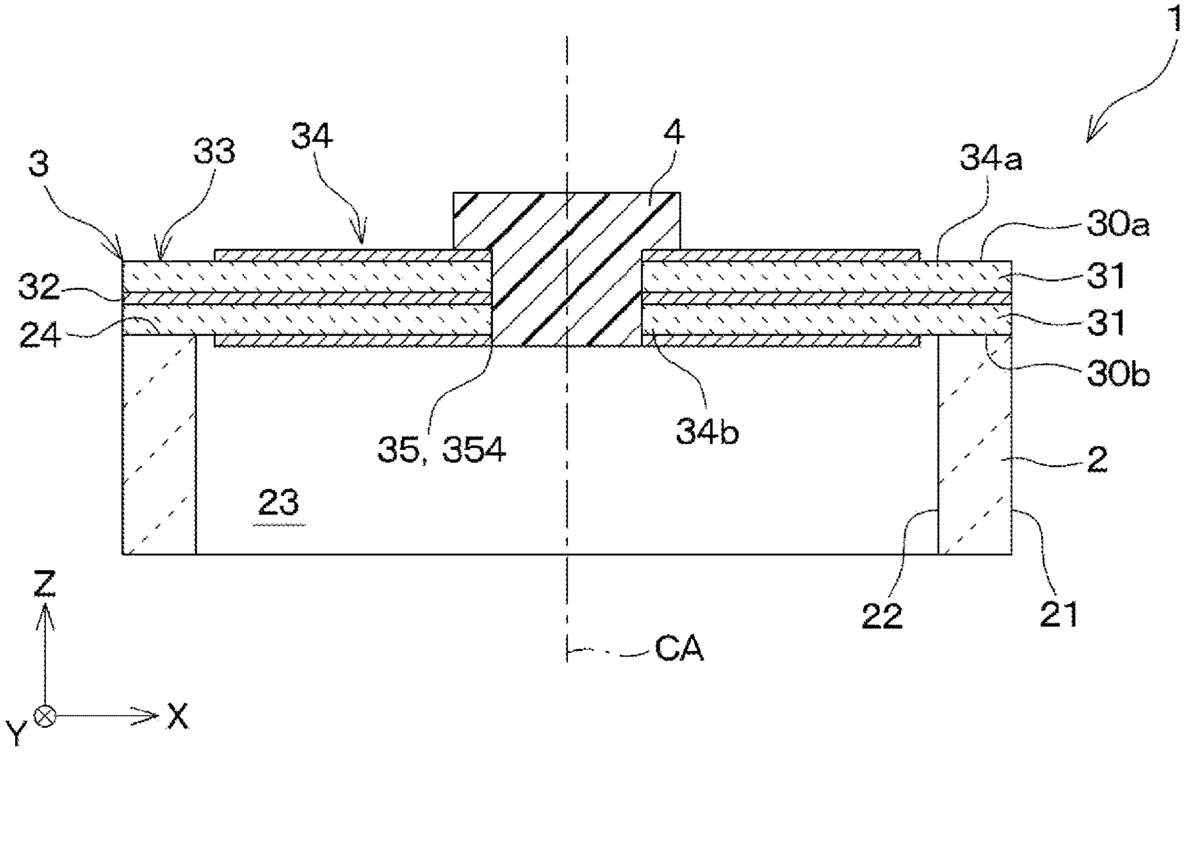
FIG. 1 is a side sectional view showing a schematic configuration of an electroacoustic transducer according to an embodiment of the present disclosure.

In a piezoelectric element having a cantilever structure, a slit is provided in a piezoelectric film, and an elastic film covers at least a part of an opening of the slit in the piezoelectric film. When the piezoelectric film or an electrode film is bent, a substantial gap between beams of the piezoelectric element becomes larger, thereby reducing an acoustic resistance. A vibration region may be provided with a slit. Even in this case, the bending of the vibration region can be suppressed by the elastic film. Therefore, an increase in the gap between the regions facing each other through the slit in the vibration region is suppressed. Further, even if the vibration region is curved, the reduction in the acoustic resistance can be suppressed by arranging the elastic film to cover at least a part of the slit. Thus, according to such a configuration, deterioration of the SN ratio and sensitivity characteristics can be suppressed.

In addition, the elastic film has a higher elasticity than the piezoelectric element portion. Therefore, it is possible to suppress the adverse effects on the resonance frequency due to the residual stress of the elastic film. In addition, breakage of the elastic film due to vibration of the vibration region in the piezoelectric element portion is also suppressed.

In this type of configuration, roll-off frequency characteristics may deteriorate as the opening area of the slit increases. For example, at least a part of the slit may be covered with an elastic film, so that the opening area of the slit is reduced and deterioration of the roll-off frequency characteristics is suppressed. However, when the covered area of the slit with the elastic film increases, the deformation of the vibration region is reduced, thereby causing a decrease in sensitivity.

In view of the circumstances exemplified above, it is an object of the present disclosure to provide an electroacoustic transducer which makes it possible to achieve both of good roll-off frequency characteristics and good sensitivity characteristics.

According to an exemplar of the present disclosure, an electroacoustic transducer includes a vibrating portion, a slit and an elastic film. The vibrating portion includes a fixed end portion and a free end portion, and extends as a cantilever from the fixed end portion to the free end portion along an extending direction that is orthogonal to a directivity axis to vibrate in a manner that the free end portion moves along the directivity axis. The slit is provided at two ends of the vibrating portion in a width direction that is orthogonal to the directivity axis and orthogonal to the extending direction. The elastic film is provided to close the slit in an axial direction aligned with the directivity axis. The slit includes a wide portion provided on a free end side, and a narrow portion that extends from the wide portion and is narrower than the wide portion, and the elastic film is provided to close the wide portion while without closing the narrow portion.

For example, at least one of the wide portion or the narrow portion may be made to have a constant width. The elastic film may be provided to open an end portion of the wide portion on a side adjacent to the narrow portion and to have a gap between an outer edge of the end portion of the wide portion and the elastic film. In this case, the gap between the outer edge of the end portion of the wide portion and the elastic film may be equal to or less than a width of the narrow portion.

The elastic film may have a cutout portion penetrating the elastic film along the axial direction, and the cutout portion may be provided to open toward the narrow portion.

According to another exemplar of the present disclosure, an electroacoustic transducer includes a vibrating portion, a slit and a through-hole portion. The vibrating portion includes a fixed end portion and a free end portion, and extends as a cantilever from the fixed end portion to the free end portion along an extending direction that is orthogonal to a directivity axis to vibrate in a manner that the free end portion moves along the directivity axis. The slit is provided at two ends of the vibrating portion in a width direction that is orthogonal to the directivity axis and orthogonal to the extending direction. The through-hole portion is provided to extend in an axial direction that is parallel to the directivity axis, and is arranged adjacently to the slit on a plane that intersects with the axial direction, to communicate with the slit on a side of the free end portion. In addition, the elastic film is provided to close the through-hole portion while without closing the slit in the axial direction.

For example, the through-hole portion may include a recess provided at the free end portion to open toward the extending direction. The elastic film may have a film through hole penetrating through the elastic film in the axial direction. The elastic film may be made of synthetic resin, may be made polyimide resin or polybenzoxazole resin, may be made of scandium aluminum nitride.

Embodiments

Hereinafter, embodiments of the present disclosure will be described based on the drawings. When various modifications applicable to one embodiment are inserted in the middle of a series of descriptions concerning the embodiment, the understanding of the embodiment may be hindered. Therefore, the modification will not be inserted in the middle of the series of descriptions regarding the embodiment, and is described collectively after that. Also, the description of each drawing and the description of the device configuration and its function or operation that is described below correspondingly are simplified for the purpose of concisely describing the content of the present disclosure, which is not intended to limit the content thereof. Therefore, it is understood that the exemplary configuration shown in each drawing does not necessarily match a specific configuration that is actually manufactured and sold. In other words, unless the applicant expressly limits the present disclosure by the prosecution history of the present application, it is understood that the present disclosure must not be interpreted as limited by the description of each drawing and the description of the device configuration and its function or operation that is described below correspondingly.

An electroacoustic transducer 1 according to an exemplar embodiment is described with reference to FIGS. 1 and 2. FIG. 1 corresponds to a cross-sectional view taken along a line I-I in FIG. 2. For the convenience of description, a right-handed XYZ orthogonal coordinate system is set such that the Z-axis is parallel to a directivity axis CA, as shown in the drawing. The directivity axis CA is a virtual straight line that serves as a directivity reference in the electroacoustic transducer 1 that transmits or receives sound waves or ultrasonic waves, and can also be referred to as a "directivity central axis." The directivity axis CA is, typically, a virtual straight line that indicates a central axis of a three-dimensional shape such as a substantially conical shape or a substantially spindle shape representing a range of directivity, for example, the range in which a predetermined gain or a predetermined sound level is obtainable. Specifically, for example, the directivity axis CA is the central axis of the sound pressure half reduction angle. Hereinafter, a direction aligned with the directivity axis CA, that is, a direction parallel to the directivity axis CA may be referred to as an "axial direction." Therefore, the axial direction is a direction parallel to the Z-axis in the drawing. A direction crossing the axial direction, typically any direction perpendicular to the axial direction, may be referred to as an "in-plane direction." The "in-plane direction" is a direction parallel to an XY plane in the drawing. The "in-plane direction" may also be referred to as a "radial direction" in some cases. The "radial direction" is a direction orthogonal to the directivity axis CA and separated away from the directivity axis CA. That is, the "radial direction" is a direction in which a half-line extends when the half-line is drawn on a virtual plane starting from an intersection of the directivity axis CA and the virtual plane itself orthogonal to the directivity axis CA. In other words, the "radial direction" is a radial direction of a circle drawn on the virtual plane centering on the intersection of the directivity axis CA and the virtual plane itself orthogonal to the directivity axis CA. The "in-plane direction" may also be referred to as a "circumferential direction" in some cases. The "circumferential direction" is a direction of a circle drawn on the virtual plane centering on the intersection of the directivity axis CA and the virtual plane itself orthogonal to the directivity axis CA. Furthermore, looking at the electroacoustic transducer 1 and its constituent elements from above in FIG. 1 with a line of sight in the direction opposite to the Z axis may be referred to as a "plan view." That is, the shape of a certain component in the "plan view" corresponds to the shape when the same component is mapped or projected onto the XY plane in the drawing.

The electroacoustic transducer 1 has a configuration as a so-called piezoelectric MEMS microphone. MEMS is an abbreviation for Micro Electro Mechanical System. Specifically, as shown in FIG. 1, the electroacoustic transducer 1 includes a support portion 2, a piezoelectric element portion 3, and an elastic film 4, as shown in FIG. 1.

The support portion 2 is formed in a cylinder or annular shape surrounding the directivity axis CA. In the present embodiment, the support portion 2 has a shape of a square cylinder or a square ring with the directivity axis CA as the central axis of symmetry. Specifically, the support portion 2 has a structure in which four flat plate-shaped wall members having a constant thickness and arranged in parallel with the directivity axis CA are seamlessly and integrally joined, which makes a square shape in the plan view. That is, the support portion 2 is configured such that an outer wall surface 21 of the support portion 2 has a square shape in the plan view. Further, a hollow portion 23, which is a space surrounded by an inner wall surface 22 of the support portion 2, has a square shape in the plan view. One side of the support portion 2 in the axial direction, i.e., an upper end surface 24 that is an end surface on a Z-axis positive direction side in the drawing of FIG. 1, is closed by the piezoelectric element portion 3. The support portion 2 may be formed of, for example, a ceramic such as alumina, a silicon-based semiconductor substrate, or the like.

The piezoelectric element portion 3 is formed in a thin plate shape having a thickness direction matched with the axial direction. That is, an upper surface 30*a* and a lower surface 30*b*, which are a pair of main surfaces of the piezoelectric element portion 3, are formed in a planar shape orthogonal to the directivity axis CA. A "principal surface" is a surface of a plate-like portion or member that is perpendicular to a plate thickness direction. The piezoelectric element portion 3 is fixedly supported by the support portion 2 by being joined to the upper end surface 24 of the support portion 2 at a peripheral edge portion of the lower surface 30*b*, that is, the outer edge portion in the radial direction. In the present embodiment, the piezoelectric element portion 3 is formed in a square shape in the plan view, corresponding to a square cylinder shape of the support portion 2.

The piezoelectric element portion 3 is composed of a piezoelectric film 31 and an electrode film 32. In the present embodiment, the piezoelectric film 31 is made of a piezoelectric material such as scandium aluminum nitride formed as a thin film. The piezoelectric element portion 3 has a multi-layer structure in which a plurality of piezoelectric films 31 are layered in the axial direction. The electrode films 32 are made of metal thin films such as copper foil, and are provided on both surfaces of the piezoelectric film 31.

The piezoelectric element portion 3 has a fixed portion 33 and a vibrating portion 34. The fixed portion 33 is a peripheral edge portion of the piezoelectric element portion 3, that is, an outer edge portion in the radial direction, and is fixed to the support portion 2. The vibrating portion 34 is provided inside the fixed portion 33 in the radial direction. The vibrating portion 34 is formed in a cantilever shape extending from the fixed portion 33 toward the directivity axis CA. That is, the vibrating portion 34 has a fixed end portion 34*a* and a free end portion 34*b*. The vibrating portion 34, which is a vibration region in the piezoelectric element portion 3, extends as a cantilever from the fixed end portion 34*a* toward the free end portion 34*b* along an extending direction orthogonal to the directivity axis CA, thereby allowing the free end portion 34*b* to vibrate, i.e., to move along the directivity axis CA. Further, the piezoelectric element portion 3 has a plurality of vibrating portions 34. In the present embodiment, as shown in FIG. 2, four vibrating portions 34 are arranged at regular intervals in the circumferential direction. In FIG. 2, the elastic film 4 is indicated by imaginary lines so that the shape of the vibrating portion 34 and a slit 35 described later can be easily seen in the plan view. The vibrating portion 34 on the upper side in FIG. 2 is formed such that the negative direction of the Y-axis is the extension direction and the X-axis direction is the width direction. The vibrating portion 34 on the lower side in FIG. 2 is formed such that the positive direction of the Y-axis is the extending direction and the X-axis direction is the width direction. The vibrating portion 34 on the right side in FIG. 2 is formed such that the negative direction of the X-axis is the extension direction and the Y-axis direction is the width direction. The vibrating portion 34 on the left side in FIG. 2 is formed such that the positive direction of the X-axis is the extension direction and the Y-axis direction is the width direction.

The slit 35 is provided at both ends of the vibrating portion 34 in the width direction of the vibrating portion 34, which is perpendicular to (i) the directivity axis CA and (ii) the extending direction of the vibrating portion 34. The slit 35 is formed to pass through (i.e., penetrate through) the piezoelectric element portion 3 in the thickness direction. That is, the vibrating portion 34 is provided at a position between a pair of slits 35. In the present embodiment, four slits 35 are formed in the piezoelectric element portion 3 in a square shape in the plan view, extending from the four corners toward the directivity axis CA, in correspondence with the four vibrating portions 34.

The slit 35 has a narrow portion 351 provided on one side close to the fixed end portion 34*a*, i.e., on an outside, and a wide portion 352 provided on the other side close to the free end portion 34*b*, i.e., on an inside. The width of the narrow portion 351 is formed to be narrower than the width of the wide portion 352. In the present embodiment, each of the narrow portions 351 is formed to have a constant width, and each of the wide portions 352 is formed to have a constant width. That is, an edge of the wide portion 352 on one side close to the narrow portion 351, that is, an outer edge 353, which is an outer edge in the radial direction, is formed in a straight line orthogonal to the extending direction of the narrow portion 351 in the plan view. In other words, the narrow portion 351 and the wide portion 352 are connected to each other to have a step portion provided at the outer edge 353. Then, a through-hole portion 354 penetrating through the piezoelectric element portion 3 along the directivity axis CA is formed as a square-shaped region, where two rectangular virtual regions overlap with each other to connect a pair of the wide portions 352 that faces with each other in the plan view with the directivity axis CA positioned therebetween. That is, the through-hole portion 354 is arranged adjacent to the slit 35 in the plane direction, to communicate with the slit 35 at one side close to the free end portion 34*b* (that is, at the end side where the vibrating portion 34 extending from the fixed end portion 34*a* ends). The through-hole portion 354 described above is provided in a central portion of the piezoelectric element portion 3 in the plane direction. The wide portion 352 extends from the through-hole portion 354 to the narrow portion 351.

The elastic film 4 is attached to the piezoelectric element portion 3 to close the slit 35 in the axial direction. The elastic film 4 has a higher elasticity than the piezoelectric element portion 3. Specifically, the elastic film 4 is made of a synthetic resin material such as polyimide resin, polybenzoxazole resin, or the like. In the present embodiment, the elastic film 4 is provided to close not the entire slit 35 in the extending direction but a part thereof. That is, as shown in FIG. 2, the elastic film 4 is provided so as not to close the narrow portion 351 but to close the wide portion 352. Specifically, the elastic film 4 is provided so as not to close an end portion of the wide portion 352 on one side close to the narrow portion 351, that is, the outer edge 353 and its proximity. More specifically, a gap G is formed between the outer edge 353 and the elastic film 4. The gap G may preferably be formed to have a width equal to or less than that of the narrow portion 351. The elastic film 4 is provided to close (i) the through-hole portion 354 and (ii) a portion of the wide portion 352 inside the outer edge 353 of the wide portion 352 in the radial direction, from an upper surface 30*a* of the piezoelectric element portion 3.

In the present embodiment, the elastic film 4 fills an inside of the slit 35 until the elastic film 4 reaches the lower surface 30*b* of the piezoelectric element portion 3. A notch 401 (i.e., a recess) is formed in the elastic film 4. The notch 401 is provided on two sides of the wide portion 352. That is, the elastic film 4 is formed in a substantially X shape in the plan view, corresponding to the substantially X shape formed by the four wide portions 352 and the through-hole portion 354 in the plan view.

Technical Effects

Hereinafter, an outline of an operation according to the configuration of the present embodiment is described with reference to the drawings, together with advantages achieved by such configuration. The electroacoustic transducer 1 according to the present embodiment has a conversion function between (a) strain due to bending or flexure of the free end portion 34*b* of the vibrating portion 34 caused by a move thereof along the directivity axis CA and (b) a voltage between the pair of electrode films 32 provided on both surfaces of the piezoelectric film 31. That is, for example, the flexural vibration of the vibrating portion 34 due to reception of sound waves or ultrasonic waves is taken out as an inter-electrode voltage. Alternatively, for example, by an application of an inter-electrode voltage from the outside, the vibrating portion 34 bends and vibrates, thereby transmitting a sound wave or an ultrasonic wave.

In the configuration of the present embodiment, even in a structure in which the fixed portion 33, which is a peripheral portion of the piezoelectric element portion 3, is fixed to the support portion 2, by providing the slit 35, it becomes possible to suppress (i) a change in the resonance frequency due to the residual stress of the vibrating portion 34, (ii) a decrease in the SN ratio, (iii) a deterioration in sensitivity characteristics and the like. Also, by covering the opening of the slit 35 with the elastic film 4, the vibrating portions 34 separated by the slit 35 are integrated. As a result, it is possible to suppress the reduction in acoustic resistance due to the substantial gap between the vibrating portions 34 becoming larger by the bending of the piezoelectric film 31 or the electrode film 32, which is caused, at least partially, by the cantilever structure of the vibrating portion 34. Moreover, since the opening area of the slit 35 is reduced, deterioration of the roll-off frequency characteristics is suppressible. Therefore, according to such a configuration, it is possible to suppress deterioration of the SN ratio and sensitivity characteristics.

If the covered area of the slit 35 covered by the elastic film 4 is increased, the deformation of the vibrating portion 34 is suppressed, thereby causing a decrease in sensitivity. In this respect, in the present embodiment shown in FIGS. 1 and 2, a portion of the slit 35 that is covered by the elastic film 4 is provided in the wide portion 352, and the covered portion of the slit 35 is formed to be wider than the width of the narrow portion 351 that is a portion not covered and not closed by the elastic film 4, thereby preferably suppressing the deterioration of the sensitivity characteristics. For example, when the electroacoustic transducer 1 according to the present embodiment is used as a MEMS microphone for speech recognition, the width of the narrow portion 351 may preferably be set to have the roll-off frequency of 100 Hz or less. Further, when the length of the beam in the cantilever structure of the vibrating portion 34 is L, the thickness of the vibrating portion 34 is H, the width of the narrow portion 351 is g, and the slit resistance is Rslit, the width g of the narrow portion 351 may preferably be set to satisfy the following equation.

$$R_{slit} = \int_0^H \int_0^L \frac{3\sqrt{2}\mu H}{(g_{(LH)})^3 L} dLdH \geq 25G\Omega \quad \text{[Equation 1]}$$

In the configuration of the present embodiment, a part of the wide portion 352 of the slit 35 is not covered and not closed by the elastic film 4 and is open in the axial direction. That is, the elastic film 4 is provided so as not to close the end of the wide portion 352 at a position adjacent to the narrow portion 351. Further, the gap G that is equal to or less than the width of the narrow portion 351 is formed at a position between the outer edge 353 of the wide portion 352 and the elastic film 4. In such manner, it is possible to achieve both good roll-off frequency characteristics and good sensitivity characteristics without compromise.

In the present embodiment, the elastic film 4 is made of synthetic resin. By forming the elastic film 4 from synthetic resin, which is a material having a lower Young's modulus than the material forming the vibrating portion 34, it is possible to satisfactorily suppress a decrease in sensitivity. In particular, because the elastic film 4 is made of a polyimide resin or a polybenzoxazole resin, which is excellent in terms of heat resistance and chemical resistance, process suitability and reliability are improvable. Furthermore, because the vibrating portion 34 is made of scandium aluminum nitride, the piezoelectricity can be improved, thereby improving the sensitivity characteristics.

The piezoelectric element portion 3 described in the above embodiment may be suitably modified. For example, a piezoelectric element portion 3 may be configured as in a configuration shown in FIG. 3. In the following description of the modified embodiment shown in FIG. 3, parts different from those of the above embodiment shown in FIGS. 1 and 2 are mainly described. In the embodiment and modifications thereof, portions that are the same or equivalent to each other are denoted by the same reference numerals. Therefore, in the following description of the following embodiments, regarding components having the same reference numerals as those in the above-described embodiment, the description in the above embodiment can be appropriately incorporated unless there is a technical contradiction or a special additional description. The same applies to other embodiments and modifications described later.

Figure 2:
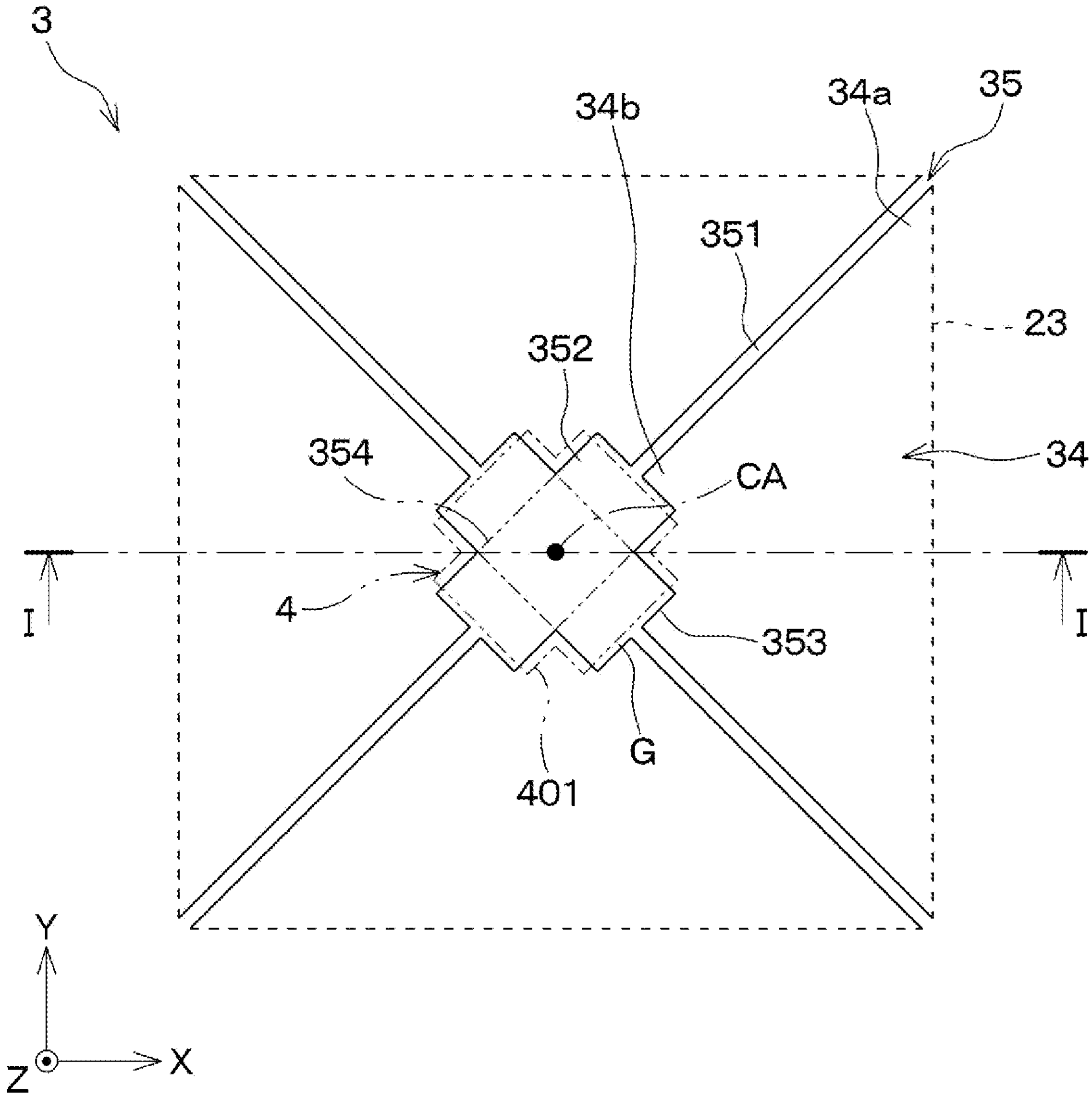
FIG. 2 is a plan view showing a schematic configuration according to the embodiment of the electroacoustic transducer shown in FIG. 1.
Figure 3:
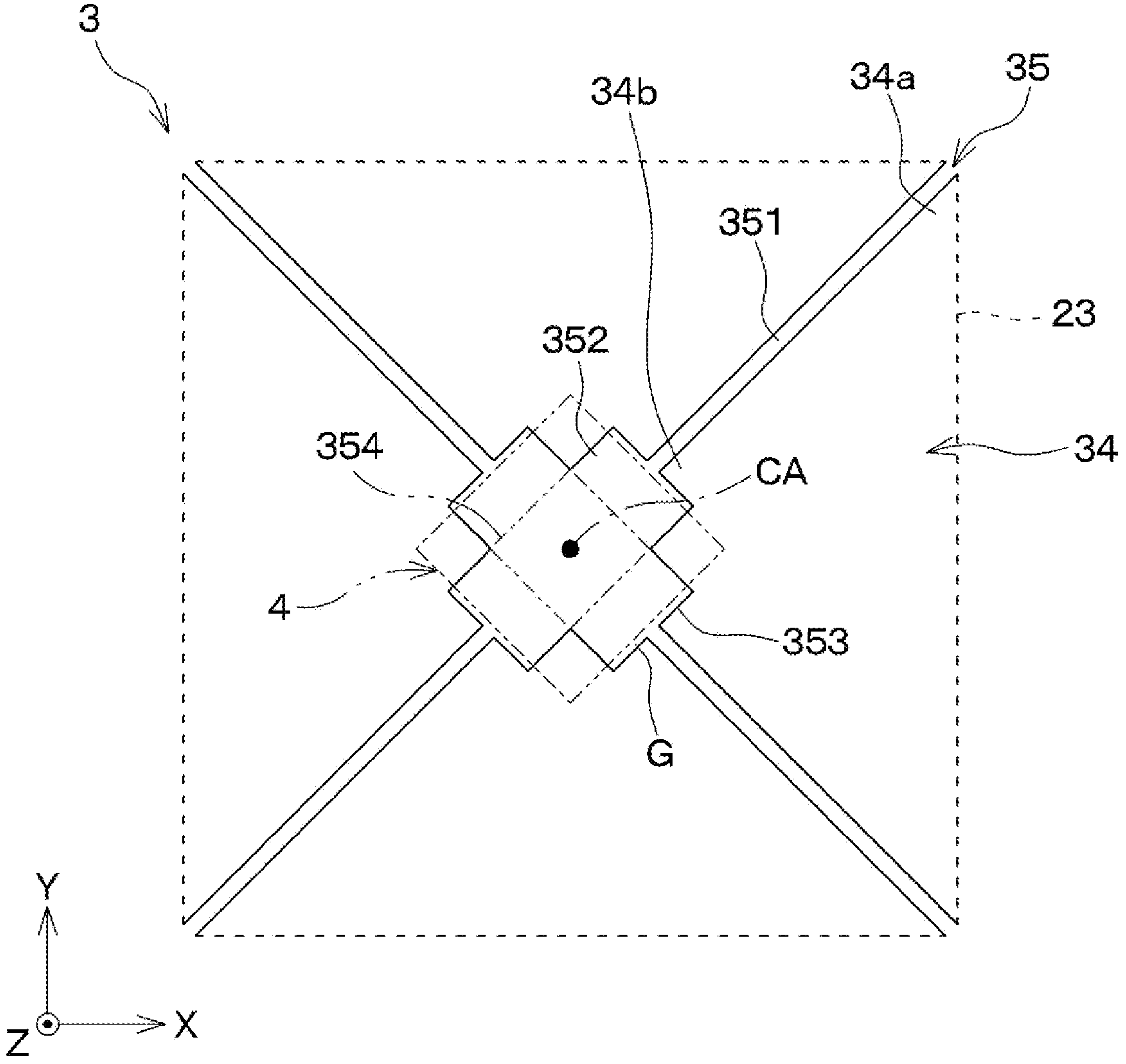
FIG. 3 is a plan view showing a schematic configuration according to a modified example of the electroacoustic transducer shown in FIG. 1.

In the above-described embodiment shown in FIGS. 1 and 2, the notch 401 (i.e., recess) is provided in the elastic film 4 in order to optimize the sensitivity characteristics. However, the present disclosure is not limited to the configuration described in the embodiment of FIGS. 1 and 2. That is, the notch 401 in the elastic film 4 shown in FIG. 2 may be not provided. For example, as shown in FIG. 3, the elastic film 4 may be formed in a rectangular shape, specifically a square shape in the plan view. Even in such the piezoelectric element portion 3 shown in FIG. 3, the other configurations are similar to those of the above-described embodiment shown in FIGS. 1 and 2, and the same effects as those of the first embodiment are achievable. Alternatively, the elastic film 4 may also be formed in a polygonal shape in the plan view.

Figure 4:
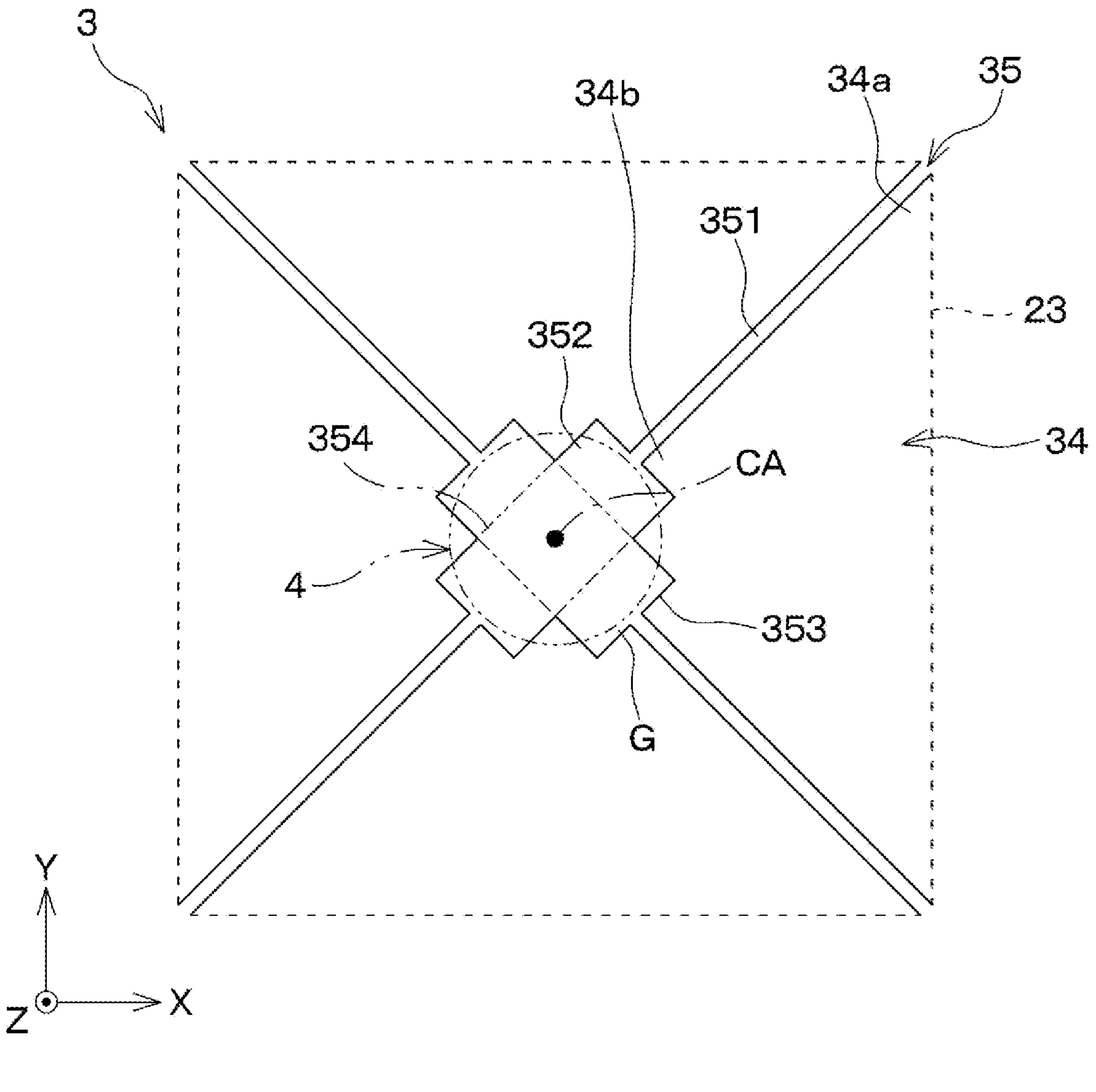
FIG. 4 is a plan view showing a schematic configuration according to an another modified example of the electroacoustic transducer shown in FIG. 1.

Alternatively, a piezoelectric element portion 3 may be configured as shown in FIG. 4. In the embodiment shown in FIG. 4, an elastic film 4 is formed in an elliptical shape, specifically a circular shape, in the plan view. Even in such a configuration of the piezoelectric element portion 3 shown in FIG. 4, the same effects as those of the above embodiment shown in FIGS. 1 and 2 are achievable. Also in the embodiment of FIG. 4, the notch 401 in the elastic film 4 shown in FIG. 2 is omitted. However, in the structure shown in FIG. 4, the elastic film 4 may be provided with the notches 401 as shown in FIG. 2, at clock positions of 3, 6, 9 and 12, for example.

Figure 5:
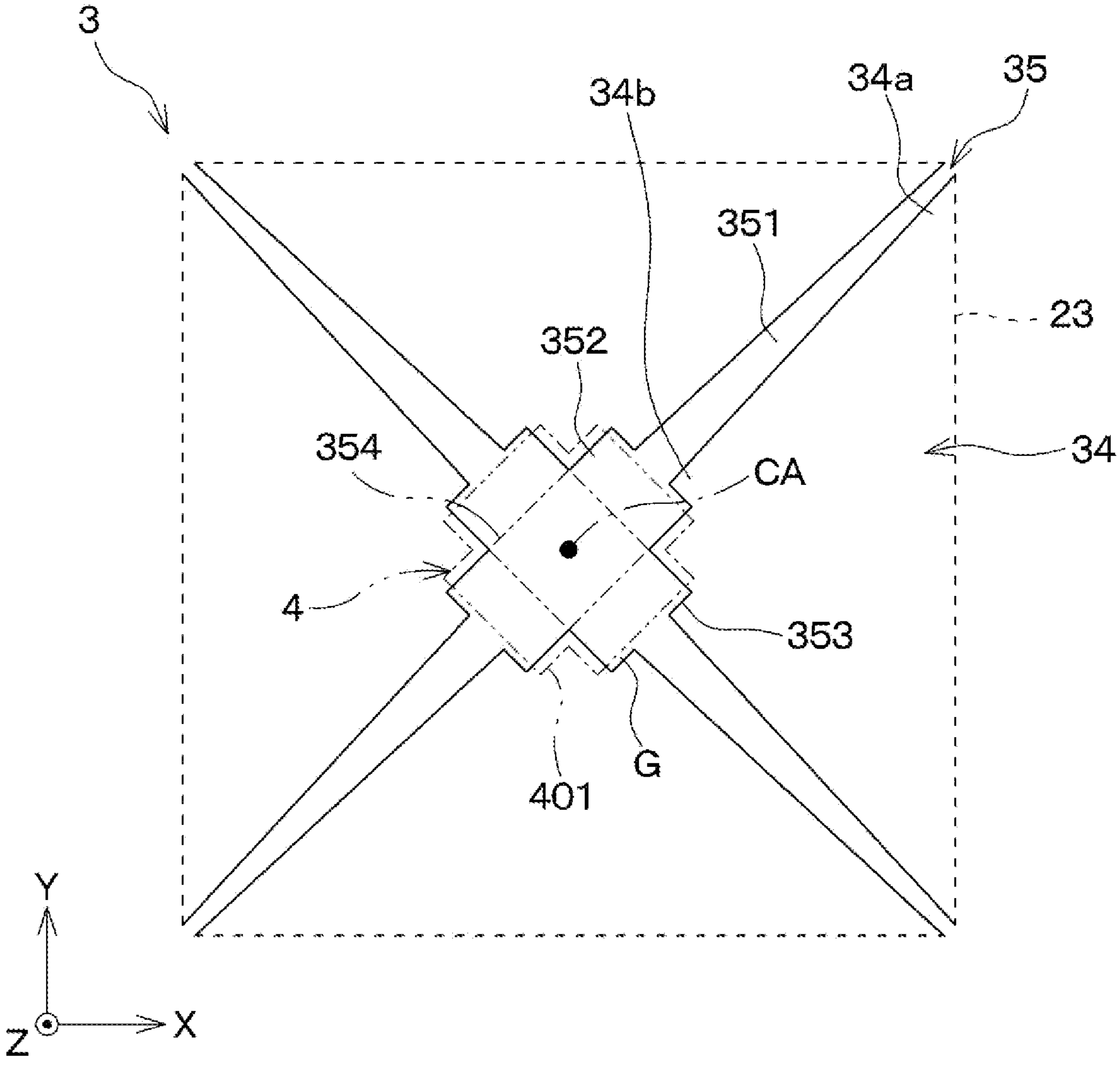
FIG. 5 is a plan view showing a schematic configuration according to an another modified example of the electroacoustic transducer shown in FIG. 1.

A piezoelectric element portion 3 may be configured as shown in FIG. 5. In the embodiment shown in FIG. 5, the narrow portion 351 is formed to have a varying width. Specifically, the narrow portion 351 is formed in a tapered shape in which the width increases continuously or linearly toward the directivity axis CA. On the other hand, the wide portion 352 is formed with a constant width. Even in such a configuration, the same effects as those of the first embodiment are achievable. Contrary to the configuration shown in FIG. 5, the width of the wide portion 352 may vary while the narrow portion 351 is formed to have a constant width. The configuration of the piezoelectric element portion 3 of the embodiment shown in FIG. 5 may be used in the piezoelectric element portion 3 shown in FIG. 3 or 4.

Figure 6:
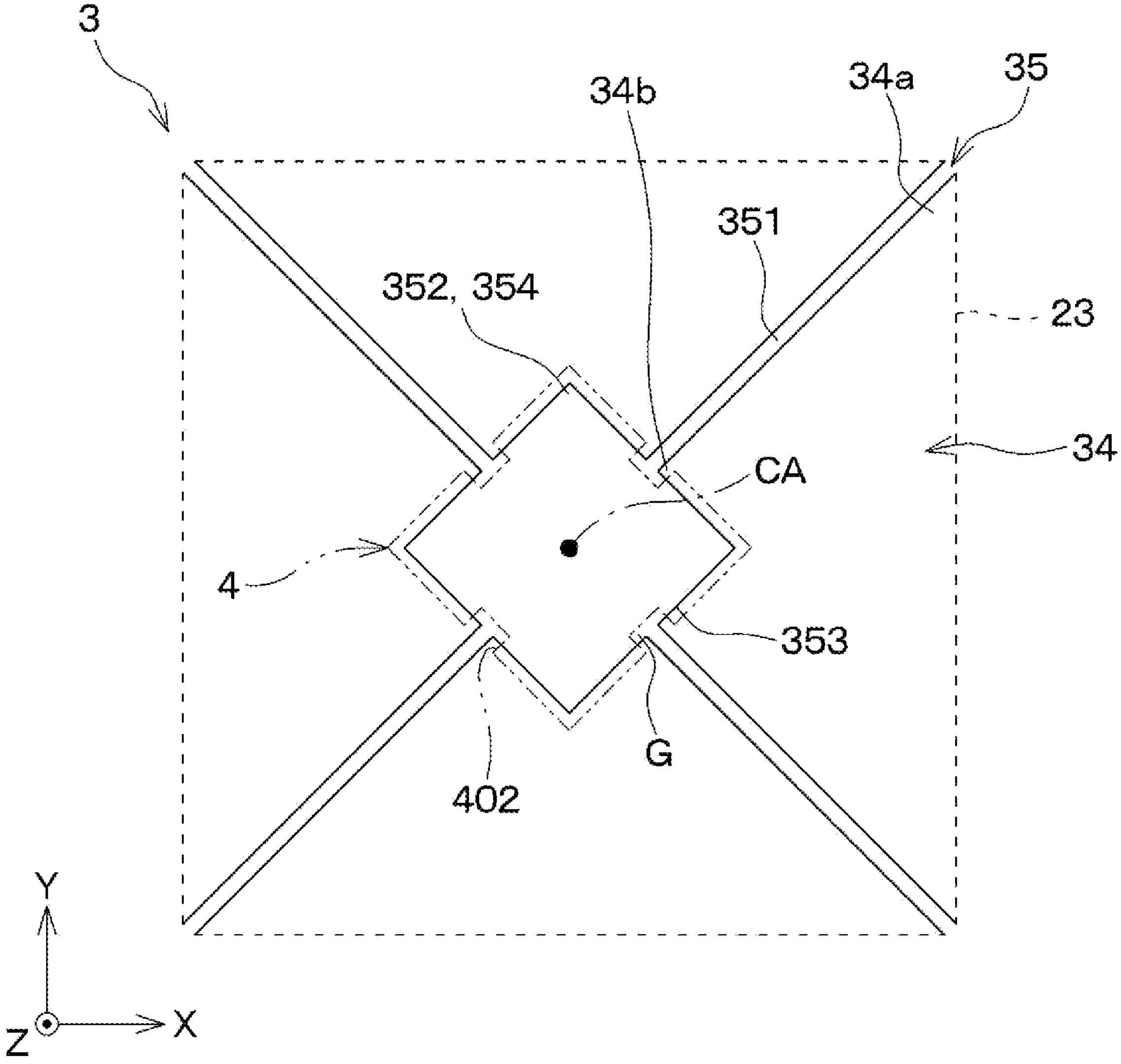
FIG. 6 is a plan view showing a schematic configuration according to an another modified example of the electroacoustic transducer shown in FIG. 1.

A piezoelectric element portion 3 may be configured as shown in FIG. 6. In the embodiment shown in FIG. 6, the wide portion 352 and the through-hole portion 354 are integrated. That is, the wide portion 352 is formed by the through-hole portion 354 which is rectangular or square in the plan view. In such case, a concave portion 402 opened toward the narrow portion 351 is provided in the elastic film 4 at a position corresponding to a connecting portion between the narrow portion 351 and the wide portion 352. By providing such a concave portion 402, an end portion of the narrow portion 351 connected to the wide portion 352 and a portion of the wide portion 352 near the connected portion to the narrow portion 351 are not closed by the elastic film 4, i.e., are open in the axial direction. In such manner, it is possible to achieve both good roll-off frequency characteristics and good sensitivity characteristics without compromise.

Figure 7:
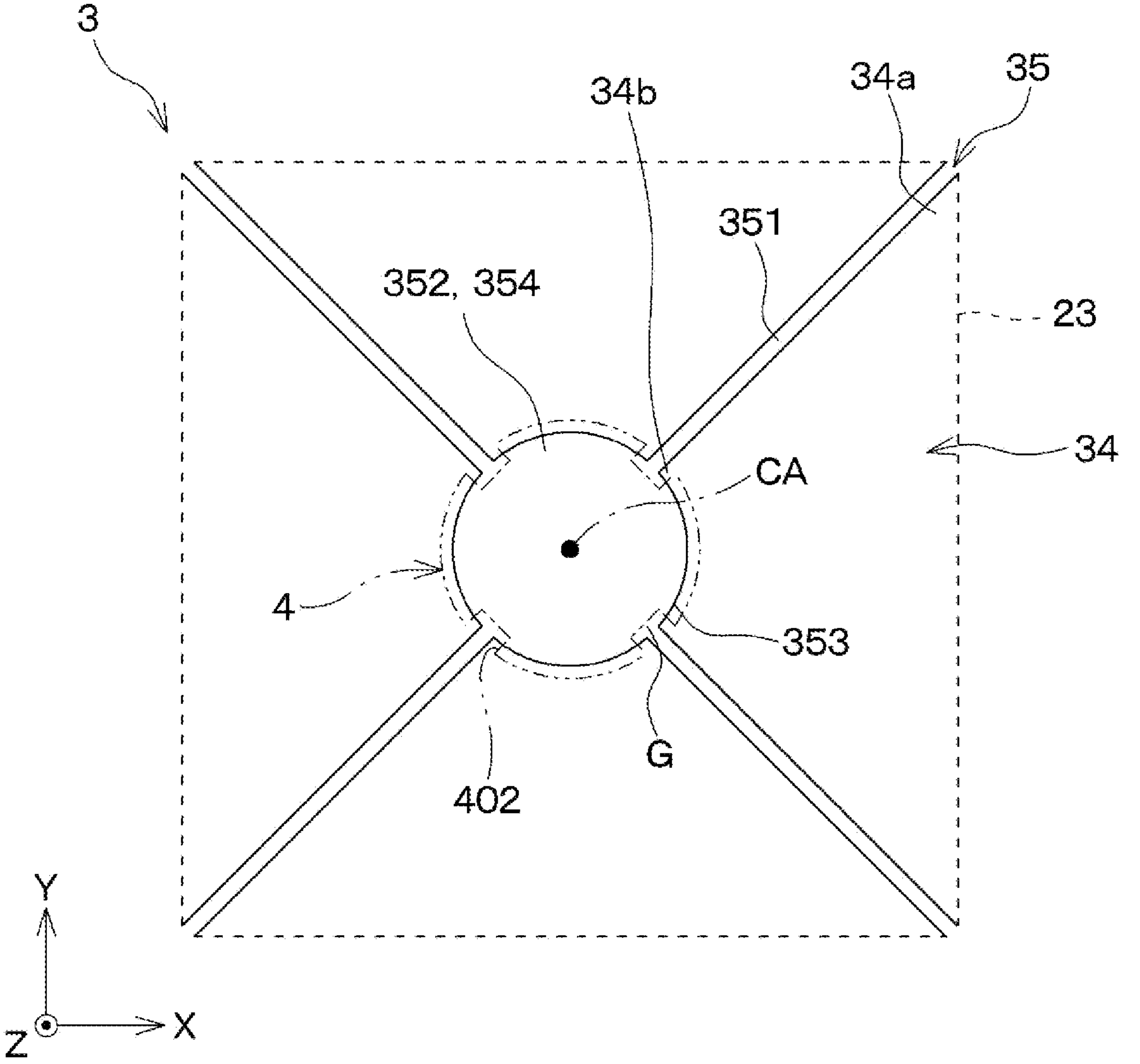
FIG. 7 is a plan view showing a schematic configuration according to an another modified example of the electroacoustic transducer shown in FIG. 1.

A piezoelectric element portion 3 may be configured as shown in FIG. 7. In the embodiment shown in FIG. 7, the shape of the through-hole portion 354 forming the wide portion 352 in the embodiment of FIG. 6 is changed to an elliptical shape, specifically a circular shape. Even in such a configuration, the same effects as those of the above embodiments are achievable. It should be noted that FIG. 7 can be evaluated as disclosing a configuration in which the width of the wide portion 352 varies while the width of the narrow portion 351 is constant. Further, the shape of the through-hole portion 354 forming the wide portion 352 in the plan view is not limited to the rectangular shape or the elliptical shape as in the above examples, and may have, for example, a polygonal shape.

Figure 8:
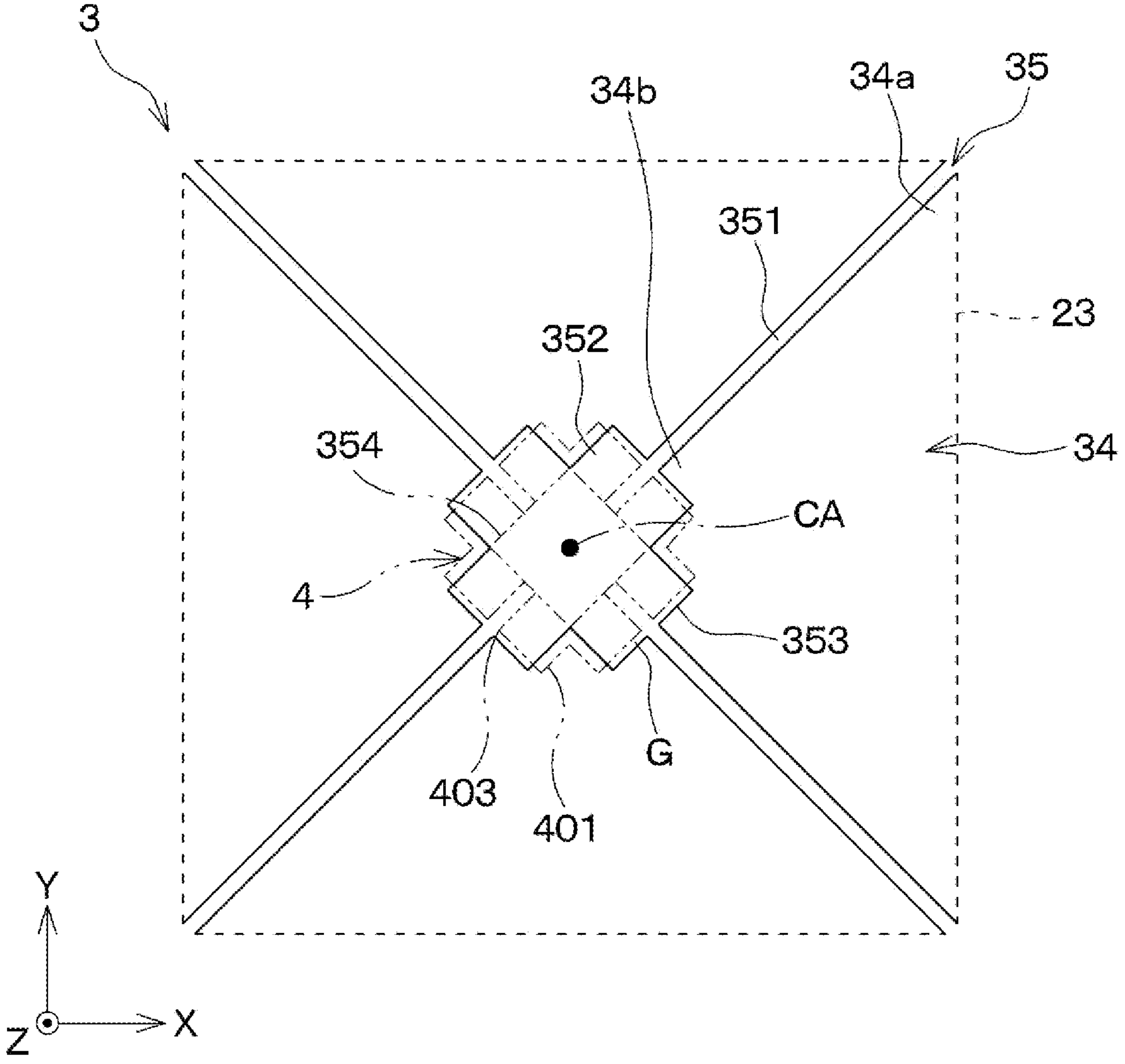
FIG. 8 is a plan view showing a schematic configuration according to an another modified example of the electroacoustic transducer shown in FIG. 1.

A piezoelectric element portion 3 may be configured as shown in FIG. 8. The configuration according to the embodiment shown in FIG. 8 is the same as that of the embodiment shown in FIGS. 1 and 2, except for the configuration of the elastic film 4. In the present embodiment shown in FIG. 8, the elastic film 4 has a cutout portion 403. The cutout portion 403 is provided to penetrate through the elastic film 4 along the axial direction. Specifically, the cutout portion 403 has a configuration as a groove or a slit portion formed in the elastic film 4 along the axial direction. Moreover, the cutout portion 403 is provided to open toward the narrow portion 351. That is, the cutout portion 403 is arranged to be continuous with the narrow portion 351 in the plan view. According to such a configuration, it is possible to satisfactorily suppress a decrease in sensitivity due to suppression of deformation of the vibrating portion 34 by the elastic film 4. In order to suppress deterioration of the roll-off frequency characteristics, it may be preferable that the cutout portion 403 has a width equal to or less than that of the narrow portion 351.

Figure 9:
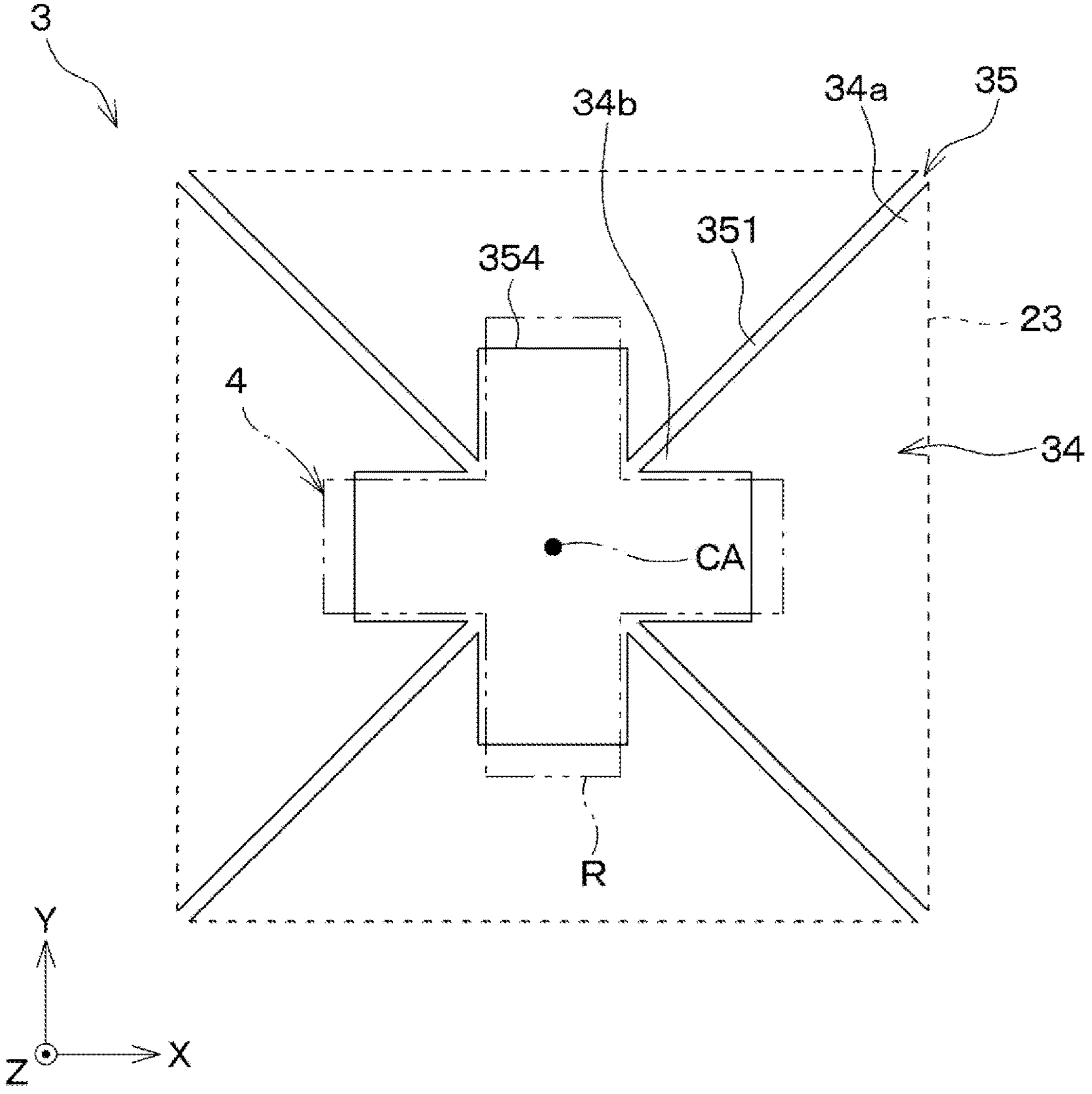
FIG. 9 is a plan view showing a schematic configuration according to an another modified example of the electroacoustic transducer shown in FIG. 1.

A piezoelectric element portion 3 may be configured as shown in FIG. 9. In the present embodiment, the slit 35 has only the narrow portion 351. The narrow portion 351 may have a constant width as shown in FIG. 9, or may be tapered as shown in FIG. 5. On the other hand, the through-hole portion 354 is arranged adjacent to the slit 35 in the in-plane direction to communicate with the slit 35 at one side close to the free end portion 34*b*, that is, at an extending side of the vibrating portion 34. Furthermore, in the configuration example shown in FIG. 9, the through-hole portion 354 is formed to include a recess R provided to open in the extending direction (that is, toward the directivity axis CA) at the free end portion 34*b*. In other words, the through-hole portion 354 is formed in a substantially cross shape in the drawing so as not to overlap with the slit 35 (that is, the narrow portion 351) formed in a substantially X shape in the drawing. Note that the recess R may have a rectangular shape as shown in FIG. 9, or a semicircular shape, or may have a polygonal shape. Further, the elastic film 4 is provided so as not to close the slit 35, but to close the through-hole portion 354 in the axial direction parallel to the directivity axis CA. The elastic film 4 may be provided to cover the through-hole portion 354 substantially entirely in the width direction of the vibrating portion 34. Alternatively, the elastic film 4 may expose both of the end portions of the through-hole portion 354 in the width direction of the vibrating portion 34 without entirely covering them. Even in such a configuration, the same effects as those of the above-described embodiments are achievable.

In the above-described embodiment shown in FIG. 2, the wide portion 352 of the slit 35 may be used as a part of the through-hole portion 354. Thus, even in the embodiment shown in FIG. 2, it is interpretable that the through-hole portion 354 including the wide portion 352 is arranged adjacent to the narrow portion 351 of the slit 35 in the in-plane direction. Therefore, it is interpretable that the elastic film 4 is provided so as not to close the narrow portion 351 of the slit 35, but to close the through-hole portion 354 including the wide portion 352 in the axial direction parallel to the directivity axis CA. The same applies to other embodiments, including the embodiment shown in FIG. 3 to the embodiment shown in FIG. 8. In such case, the embodiment shown in FIG. 6 corresponds to a case in which the recess R shown in FIG. 9 has a triangular shape.

Modifications

The present disclosure is not limited to the embodiments described above. Therefore, the above embodiments can be appropriately changed. Hereinafter, typical modifications are described. In the following description of the modifications, differences from the above embodiments are mainly described. In the above embodiments and the modifications, the same reference numerals are assigned to the same or equivalent components/configuration. Therefore, in the following description of the modifications, regarding components having the same reference numerals as those in the above-described embodiments, the description in the above-described embodiments can be appropriately incorporated unless there is a technical contradiction or a special additional description.

The present disclosure is not limited to the specific device configurations described in the above embodiments. That is, as described above, the description of the above embodiments is the one simplified for the purpose of concisely describing the content of the present disclosure. Therefore, components that are normally provided in products that are actually manufactured and sold, such as casings, bonding materials, terminals, wiring, etc., are appropriately omitted from illustration and description in the above embodiments and the corresponding drawings.

The support portion 2 may be formed in various shapes, such as a cylindrical shape, an elliptical cylindrical shape, a triangular cylindrical shape, a pentagonal cylindrical shape, a hexagonal cylindrical shape, an octagonal cylindrical shape, etc., surrounding the directivity axis CA. Alternatively, the support portion 2 may also have a shape, such as an annular ring shape, an elliptical ring shape, a triangular ring shape, a pentagonal ring shape, a hexagonal ring shape, an octagonal ring shape, etc. surrounding the directivity axis CA. Similarly, the piezoelectric element portion 3 may have any shape including a circular, elliptical, triangular, pentagonal, hexagonal, octagonal, or other shapes in the plan view.

Although the piezoelectric element portion 3 is fixed to the upper end surface 24 of the support portion 2 in the above embodiments, the present disclosure is not limited to such configuration. That is, for example, an outer edge of the piezoelectric element portion 3 in the in-plane direction or in the radial direction may be fixed by a groove, an adhesive layer, or the like provided on the inner wall surface 22 of the support portion 2.

The number of vibrating portions 34 provided in the piezoelectric element portion 3 is also not particularly limited. That is, for example, the piezoelectric element portion 3 may include a pair of vibrating portions 34 facing each other, similar to the configuration described in U.S.2008/0218031A (corresponding to WO 2007/060768) that is incorporated herein. Alternatively, for example, the piezoelectric element portion 3 may include three or five or more vibrating portions 34.

The elastic film 4 may be formed in the shape of a flat film having a certain thickness and bonded onto the upper surface 30*a* of the piezoelectric element portion 3. That is, the elastic film 4 may have a configuration that does not enter into an inside of the slit 35 in the axial direction, i.e., in the thickness direction of the piezoelectric element portion 3, and may be provided to cover the slit 35 from the outside. In addition, the elastic film 4 is not limited to a configuration in which it is provided on the upper surface 30*a* of the piezoelectric element portion 3. That is, for example, the elastic film 4 may be provided on a side of a lower surface 30*b* of the piezoelectric element portion 3.

In the embodiment shown in FIG. 2 or the like, the outer edge 353 of the wide portion 352 may be formed in a curved shape in the plan view, or may be formed in a straight-line shape inclined with respect to the extending direction of the narrow portion 351. Moreover, the wide portion 352 may be formed in a tapered shape that widens in width as it approaches the directivity axis CA. That is, the shape of the slit 35 in the plan view is not particularly limited, to include shapes other than the above.

Figure 10:
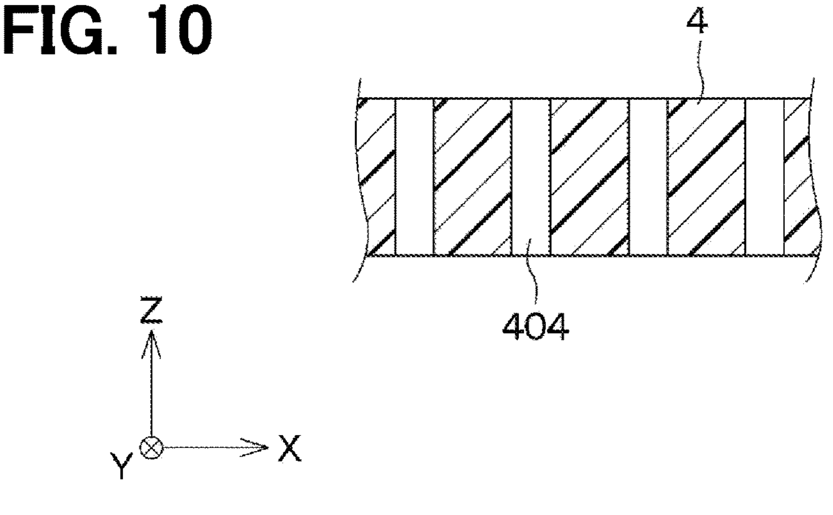
FIG. 10 is a side cross-sectional view showing a schematic configuration according to an another modified example of the elastic film shown in FIG. 1.

As shown in FIG. 10, the elastic film 4 may be provided with a film through hole 404 penetrating through the elastic film 4 in the axial direction. The number of film through holes 404 formed in the elastic film 4 may be one or may be two or more. The shape of the film through hole 404 in the plan view may be a circular, elliptical, or polygonal shape. When a plurality of film through holes 404 are provided, there is no particular limitation on the arrangement in the plane direction. A total area size of the film through holes 404 may preferably be equal to or less than the area size of the narrow portion 351 in order to maintain good roll-off frequency characteristics, when a plurality of film through holes 404 are provided.

In the above description, a plurality of elements formed integrally with each other with no seam joint may also be formed by bonding separate members together. Similarly, a plurality of elements formed by bonding separate members together may be formed integrally with each other with no seam joint.

In the above description, a plurality of elements formed of the same material may be formed of different materials. Similarly, a plurality of elements formed of different materials may be formed of the same material.

The element(s) of each of the above embodiments is/are not necessarily essential unless it is specifically stated that the element(s) is/are essential in the above embodiments or the element(s) is/are obviously essential in principle. In addition, when numerical values such as the number, numerical value, amount, range, etc. of a constituent element are mentioned, unless it is explicitly stated that it is particularly essential or when it is clearly limited to a specific number in principle, the present disclosure is not limited to such number mentioned in the embodiment. Similarly, when the shape, direction, positional relationship, etc. of the constituent elements, etc. are mentioned, unless (a) it is explicitly stated that it is particularly essential, or (b) it is limited to a specific shape, direction, positional relationship, etc. in principle, the present disclosure is not limited to such shape, direction, positional relationship, etc.

The modifications are not limited to the above-described exemplary descriptions. That is, for example, multiple embodiments can be applied in combination. In other words, part of one embodiment can be combined with part of another embodiment. There is no particular limitation on the number or arrangement of combining multiple embodiments. Also, any one of the multiple embodiments and any one of the multiple modifications can be combined with each other as long as they are not technically inconsistent. Similarly, one of the multiple embodiments or modifications is combinable with another thereof, unless technical inconsistency hinders such a combination.

What is claimed is:

1. An electroacoustic transducer comprising:

a vibrating portion having a fixed end portion and a free end portion, and extending as a cantilever from the fixed end portion to the free end portion along an extending direction that is orthogonal to a directivity axis to vibrate in a manner that the free end portion moves along the directivity axis;

a slit provided at two ends of the vibrating portion in a width direction that is orthogonal to the directivity axis and orthogonal to the extending direction; and an elastic film provided to close the slit in an axial direction aligned with the directivity axis, wherein the slit includes a wide portion provided on a free end side, and a narrow portion that extends from the wide portion and is narrower than the wide portion, and the elastic film is provided to close the wide portion while without closing the narrow portion.

2. The electroacoustic transducer according to claim 1, wherein at least one of the wide portion or the narrow portion is made to have a constant width.

3. The electroacoustic transducer according to claim 1, wherein the elastic film is provided to open an end portion of the wide portion on a side adjacent to the narrow portion and to have a gap between an outer edge of the end portion of the wide portion and the elastic film.

4. The electroacoustic transducer according to claim 3, wherein the gap between the outer edge of the end portion of the wide portion and the elastic film is equal to or less than a width of the narrow portion.

5. The electroacoustic transducer according to claim 1, wherein the elastic film has a cutout portion penetrating the elastic film along the axial direction, and the cutout portion is provided to open toward the narrow portion.

6. The electroacoustic transducer according to claim 1, wherein the elastic film has a film through hole penetrating through the elastic film in the axial direction.

7. The electroacoustic transducer according to claim 1, wherein the elastic film is made of synthetic resin.

8. The electroacoustic transducer according to claim 7, wherein the elastic film is made of polyimide resin or polybenzoxazole resin.

9. The electroacoustic transducer according to claim 1, wherein the vibrating portion is made of scandium aluminum nitride.

10. An electroacoustic transducer comprising:

a vibrating portion having a fixed end portion and a free end portion, and extending as a cantilever from the fixed end portion to the free end portion along an extending direction that is orthogonal to a directivity axis to vibrate in a manner that the free end portion moves along the directivity axis;

a slit provided at two ends of the vibrating portion in a width direction that is orthogonal to the directivity axis and orthogonal to the extending direction; and a through-hole portion provided to extend in an axial direction that is parallel to the directivity axis, and arranged adjacently to the slit on a plane that intersects with the axial direction, to communicate with the slit on a side of the free end portion; and an elastic film provided to close the through-hole portion while without closing the slit in the axial direction.

11. The electroacoustic transducer according to claim 10, wherein the through-hole portion includes a recess provided at the free end portion to open toward the extending direction.

* * * * *